United States Patent [19]

Slavin et al.

[11] Patent Number: 4,578,662

[45] Date of Patent: Mar. 25, 1986

[54] SOLENOID ASSEMBLY

[75] Inventors: Michael Slavin, Troy; Ellsworth S. Miller, Mt. Clemens, both of Mich.

[73] Assignee: Lectron Products, Inc., Rochester, Mich.

[21] Appl. No.: 659,898

[22] Filed: Oct. 11, 1984

[51] Int. Cl.[4] .............................................. H01F 7/08
[52] U.S. Cl. ................................................... 335/262
[58] Field of Search .............. 335/251, 255, 262, 278, 335/281

[56] References Cited

U.S. PATENT DOCUMENTS

| | | | |
|---|---|---|---|
| 3,295,079 | 12/1966 | Brown | 335/278 X |
| 3,396,354 | 8/1968 | Fisher | 335/262 X |
| 3,757,263 | 9/1973 | Saarem et al. | 335/262 X |
| 3,837,618 | 9/1974 | Juhel | 335/255 X |
| 4,153,890 | 5/1979 | Coors | 335/262 X |
| 4,228,415 | 10/1980 | Schantz | 335/255 |

Primary Examiner—George Harris
Attorney, Agent, or Firm—Harness, Dickey & Pierce

[57] ABSTRACT

A solenoid having a coil that includes the usual bobbin or spool, winding and armature in combination with a flux collector that is uniquely formed and associated with the coil bobbin and with the armature to maintain essentially precise concentricity between the flux collector and the armature and the intervening air gap of a uniform minimum width dimension so as to minimize the size of the coil and loss of armature power in use while at the same time assuring an adequate and reliable operating force in the armature.

30 Claims, 6 Drawing Figures

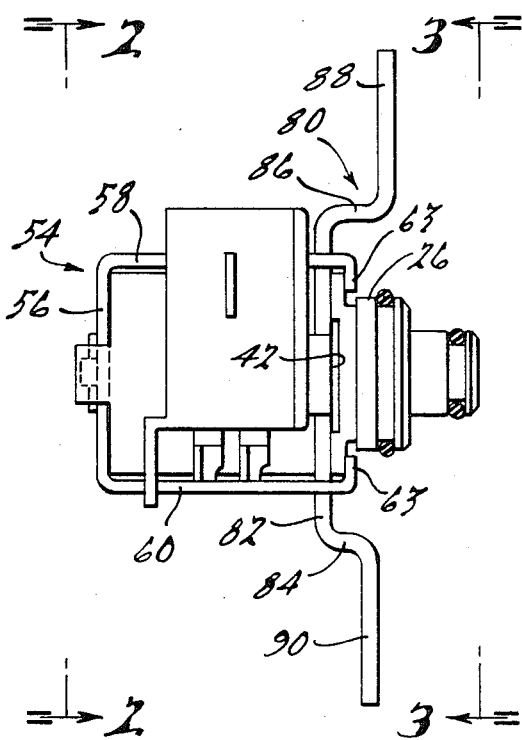
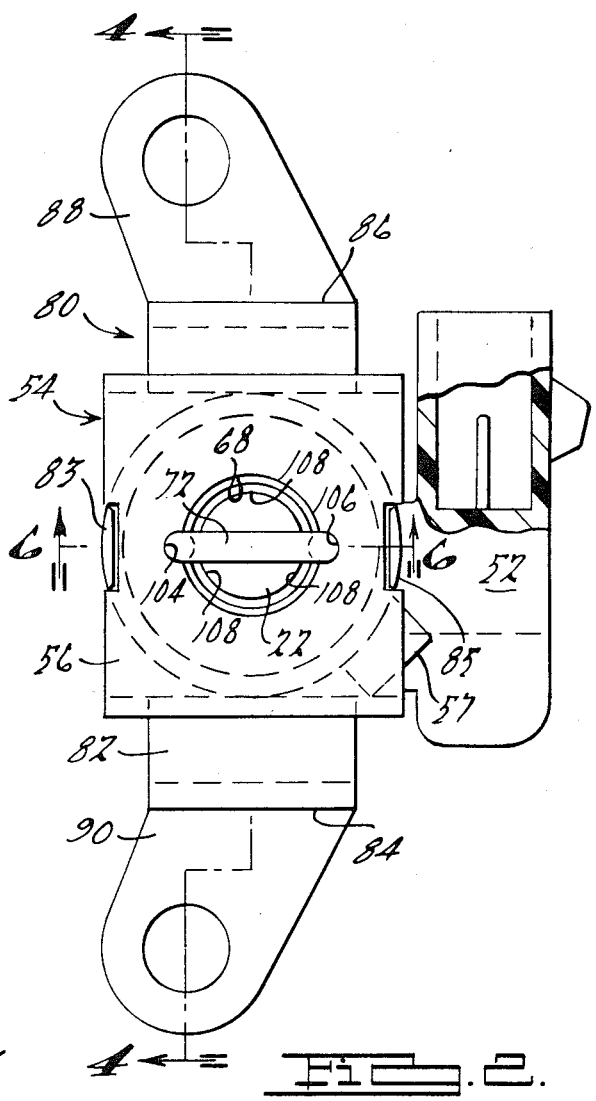
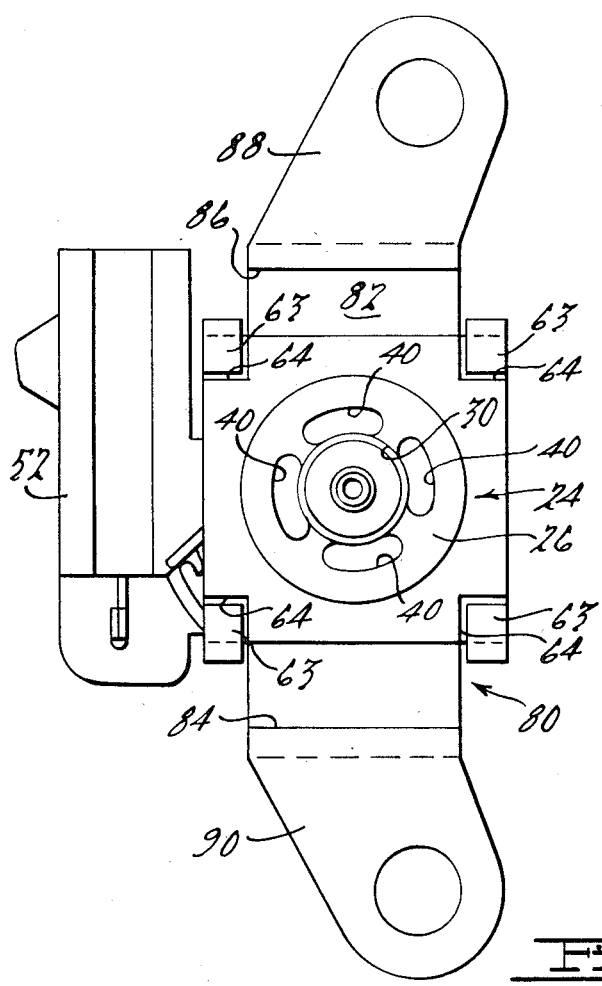
FIG. 1.
FIG. 2.
FIG. 3.

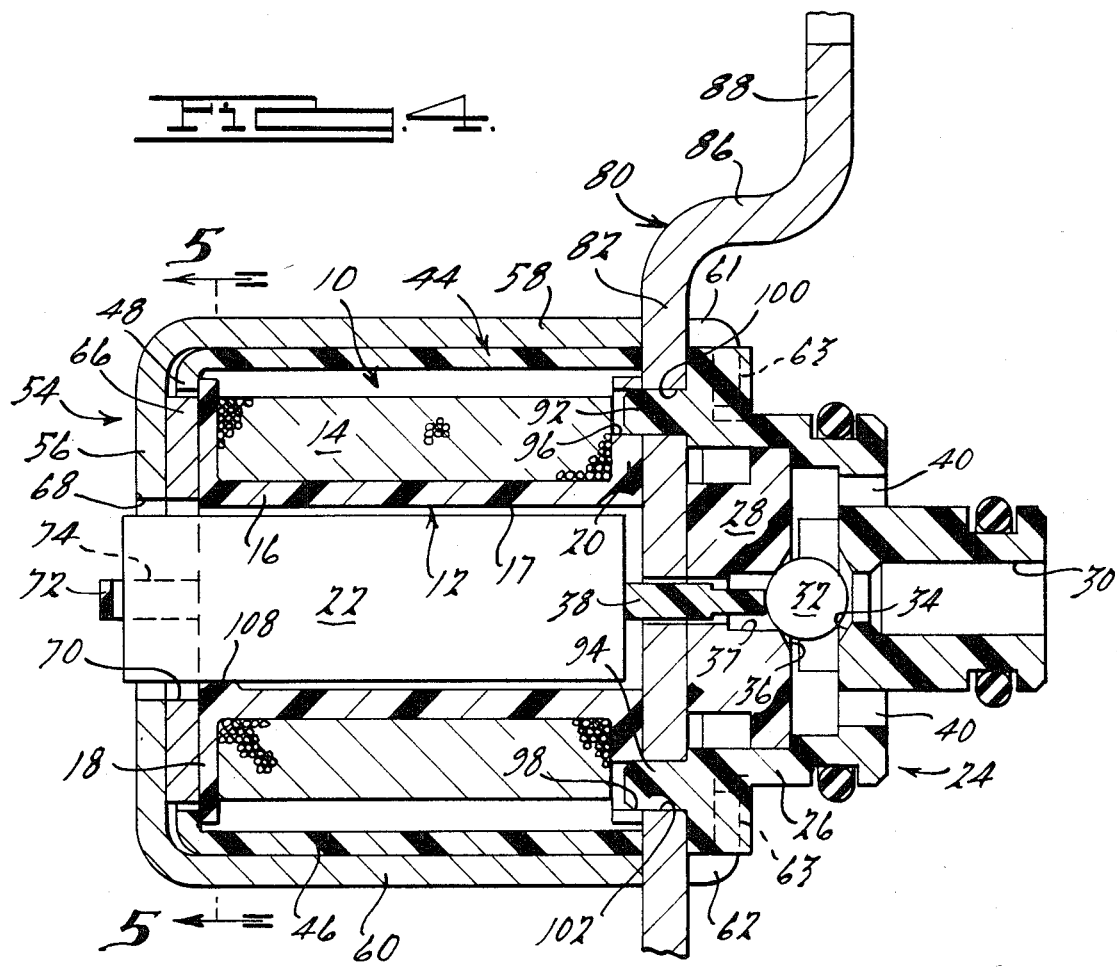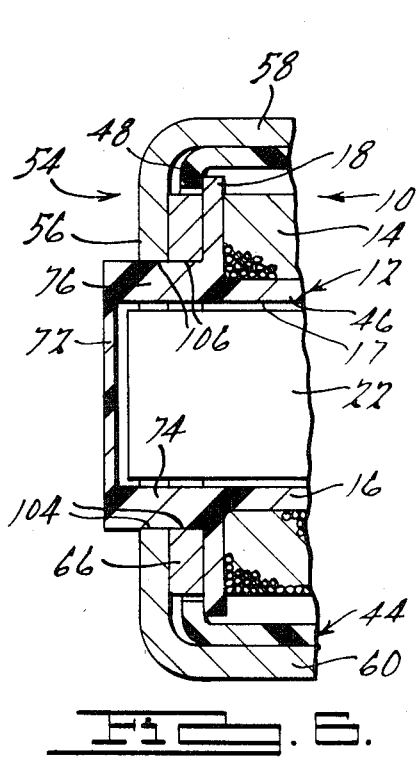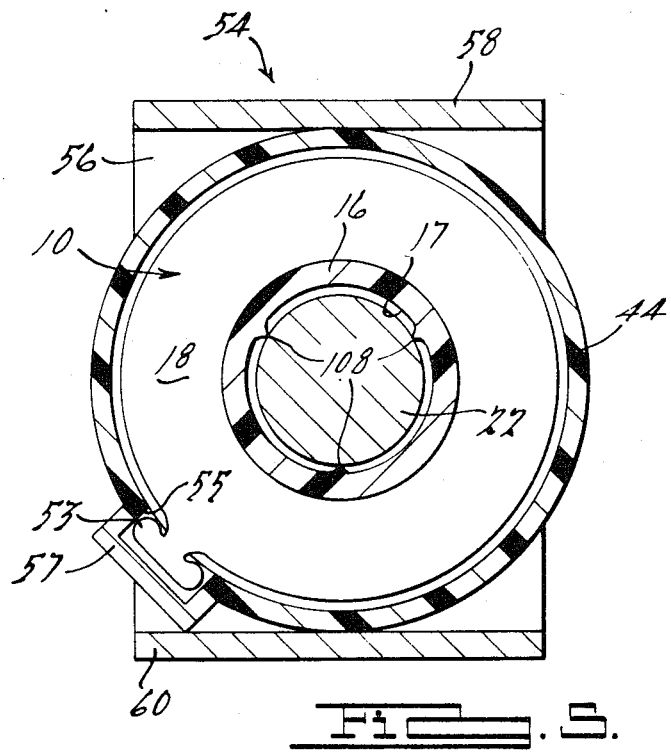

SOLENOID ASSEMBLY

BACKGROUND OF THE INVENTION

Although it has general utility, the solenoid of this invention was developed particularly for use in combination with the shift control valve conventionally used in automotive transmissions and it is designed particularly to keep the size of the assembly as small as possible so that it will fit conveniently in the restricted space available in that particular environment but at the same time will actuate the armature reliably with requisite force. In addition, the required force is achieved using less wire in the winding of the solenoid coil which further contributes significantly to the miniaturization of the assembly and achieves a significant reduction in the manufacturing cost of the solenoid.

SUMMARY OF THE INVENTION

The instant solenoid has the usual coil in which wire of copper or the like is wound on a bobbin or spool in which the armature is reciprocably mounted; and the spool is enclosed in a suitable housing to which the valve operated by the solenoid is attached. Magnetic flux created in use by the solenoid is discharged by a flux collector that surrounds the spool. The armature is mounted for free but limited sliding movement in one direction through an opening provided in the flux collector; and the spool is uniquely associated with both the flux collector and the armature to hold the latter precisely centered in the flux collector hole through which it moves. Minimum clearance must be provided and maintained between the armature and the flux collector so as to minimize loss of power in the armature required for operation of the valve or other device with which the coil is associated in use. At the same time, the critical spatial relationships between the spool, the armature, and the flux collector are assured and maintained even though the various components involved in the relationship are manufactured relatively inexpensively by mass production operations and therefore subject to the usual variations in form and differences in size due to manufacturing conditions and tolerances.

More particularly, locating pins are cooperatively associated with the spool and with the flux collector to position the central bore of the spool precisely in coaxial relation with respect to the hole in the flux collector through which the armature moves in use; and the association of parts is such that automatic centering of the spool is achieved and assured at assembly. The armature is centered and guided in the bore by a plurality of circumferentially spaced ribs or lands that automatically position the armature precisely coaxially in the flux collector hole and it does so in a manner that compensates automatically for out-of-roundness of the bore as well as minor variations in the degree of out-of-roundness in different spools.

DESCRIPTION OF THE DRAWINGS

In the drawings:

FIG. 1 is a side elevational view of a solenoid valve embodying the present invention;

FIG. 2 is a top plan view thereof looking in the direction of the arrows 2—2 in FIG. 1;

FIG. 3 is a bottom plan view looking in the direction of the arrows 3—3 in FIG. 1;

FIG. 4 is a longitudinal sectional view taken on the line 4—4 of FIG. 2;

FIG. 5 is a transverse sectional view taken on the line 5—5 of FIG. 4; and

FIG. 6 is a fragmentary longitudinal sectional view taken on the line 6—6 of FIG. 2.

DESCRIPTION OF THE PREFERRED EMBODIMENT

In the drawing, wherein for the purpose of illustration is shown a preferred embodiment of the invention, the numeral 10 designates a solenoid coil that comprises the usual spool or bobbin 12 and winding 14 of copper wire or the like. The bobbin 12 preferably is injection molded according to conventional practice of a suitable plastic resin material such as nylon, for example, and it has the usual tubular center portion 16, which defines a central bore 17, and radially outwardly extending end flanges 18 and 20. The wire 14 is wound around the core 16 between the end flanges 18 and 20.

Mounted for axial sliding movement in the bore 17 is an armature 22 which preferably is made of a metal having good magnetic conductivity properties such as low carbon steel. When the coil 10 is energized by passing an electric current through the winding 14, the armature 22 is caused to move longitudinally in the bobbin 12 in the usual manner. In the particular solenoid here shown by way of illustration, the armature 22 projects beyond one end of the bobbin 12, as perhaps best shown in FIG. 4; and energization of the winding 14 causes the armature to move to the right, as shown in the drawing. The force with which the armature 22 is moved, depends in some degree on the amount of wire in the winding 14; and, in practice, sufficient wire is wound on the bobbin 12 to produce the amount of force in the armature required for the particular work to be performed by the latter in use.

By way of example, the solenoid is here shown combined with a conventional transmission shift control valve, designated generally by the numeral 24, having the usual valve body 26 and exhaust valve plate 28 both of which are conventionally injection molded of a suitable plastic resin material. In the particular valve 24 here shown, transmission fluid enters the valve body 26 through an inlet 30 which is controlled by a check valve ball 32. The latter is free to move back and fourth between opposed valve seats 34 and 36; and it closes the seat with which it is engaged. The valve seat 34 is at the left hand or inner end of the inlet 30; and the valve seat 36 is on the right hand or inner end of a central opening 37 in the exhaust valve plate 28.

When the solenoid coil 10 is energized to move the armature 22 to the right as viewed in the drawing, the latter acts through a push rod 38 to hold the check valve ball 32 on the seat 34 to close the inlet 30. Contrariwise, when the solenoid coil 10 is deenergized, pressure of transmission fluid at the inlet 30 act against the check valve ball 32 to move the latter against the seat 36 so as to open the inlet and to permit transmission fluid to flow to the transmission clutch (not shown) through the valve body 26 and a plurality of outlet ports 40 which are arranged concentrically around the inlet as shown in FIG. 3. Thus, the particular valve 24 here shown is a normally open valve which is closed by energization of the solenoid coil 10. Closure of the valve 24 permits transmission fluid from the clutch to enter the valve body 26 through the ports 40 and to exhaust through openings 42 at opposite sides of the valve body 26.

In connection with the foregoing, it will be readily appreciated that the solenoid of this invention has utility in environmental situations other than the particular one here shown by way of example. The novel structural features of the solenoid and the advantages achieved thereby can be utilized to particular advantage wherever the solenoid has utility and wherever it and the device it is associated with must occupy or fit into a small or confined space; but it obviously is pre-eminently suited for other uses and environments as well.

The transmission shift control valve here shown is normally open; and the valve therefore is mounted at the right hand end of the solenoid, as the latter is shown in the drawing. However, it will be readily appreciated that, if the solenoid is to be used with a valve that is normally closed, the latter would be mounted at the opposite or left hand end of the solenoid so that energization of the winding 14 would open the valve instead of close it.

Regardless of the particular device associated with the solenoid or the environment in which it is intended to be used, however, the solenoid is primarily adapted and pre-eminently suited for large scale manufacture where high production operations permit it to be produced for relatively little cost.

In situations of the type here shown by way of example, the armature 22 is only required to develop sufficient force to unseat the check valve ball 32 from seat 36 against the pressure of transmission fluid at the inlet 30; and only sufficient wire need be used in the winding 14 to produce the necessary force in the armature. Thus, the amount and therefore the cost of the wire required in the winding 14 is minimized by the novel construction of this invention; and the solenoid itself is miniaturized since the bobbin 12 need be made only large enough to accommodate the amount of wire required in the winding.

The novel structural features of the solenoid keeps resistance to flow of magnetic flux produced when the winding 14 is energized at a minimum and thereby assure adequate mechanical force at the armature using a minimum amount of wire in the winding and utilization of a minimum sized bobbin 12. At the same time, manufacturing costs are kept at a minimum by making as many parts of the assembly as possible of relatively inexpensive plastic resin material utilizing conventional injection molding procedures.

In view of the wide variety of uses for which the solenoid of this invention is adapted, the coil 10 is enclosed in a casing 44 that also can be injection molded inexpensively of plastic resin material. The casing 44 has a tubular wall 46 that surrounds the bobbin 12 and the winding 14. An inwardly extending radial flange 48 at one end of the casing wall 46 remote from the valve 24 overlays and seats against the outer marginal portion of the spool end flange 18; and, in the particular construction here shown by way of illustration, the opposite end of the casing wall 46 seats against a part 80 that defines a mounting bracket for the solenoid assembly of this invention and which also is part of the flux collector previously referred to and hereinafter described in detail. The ends of the wire in the winding 14 extend into and are attached to a two-blade electrical connector (not shown) that is mounted in an electrical terminal 52 formed integrally on and disposed exteriorly of the casing 44. A radially outwardly extending guide lug 53 on the bobbin flange 18 which projects into a longitudinal slot 55 in the casing 44 locates the bobbin 12 rotatively or angularly in the casing. For assembly purposes, the slot 55 opens through the right hand or valve end of the casing; and at the opposite end of the casing the slot terminates in a closed housing 57 that shields and protects the lug 53 contained therein.

The flux collector of this invention comprises a U-frame 54, the bight portion 56 of which extends transversely across the left hand end of the casing 44, as the latter is shown in FIG. 4 of the drawing, and diametrically with respect to the left hand end of the bobbin 12. The parallel arm portions 58 and 60 of the U-frame 54 embrace and snugly receive the casing 44. A mounting bracket in the form of an elongate metal strap extends diametrically across the opposite or right hand ends of the bobbin 12 and the casing 44; and the terminal portions of the bracket extend through recesses 61 and 62 in the free ends of the U-frame 54. Laterally spaced tabs 63 on the ends of the U-frame arm portions 58 and 60 are bent laterally inwardly over the valve body 26 at the corners of the latter to hold the solenoid and the valve securely together. If desired, the corners of the valve body 26 can be formed with recesses 64 that accept and to some extent conceal the tabs 63, as best shown in FIGS. 3 and 4. The flux flow path is completed at the valve end of the solenoid by the mounting bracket 80. The middle portion 82 of the mounting bracket bears on the adjacent end of the casing 44 and longitudinal tabs 83 and 85 on the casing at opposite sides of the U-frame 54 embrace the latter to position the casing rotatively or angularly on and with respect to the mounting bracket. In the particular valve arrangement here shown by way of illustration, the terminal portions of the mounting bracket 80 are offset different distances away from the solenoid, as shown at 84 and 86, to position the mounting or attaching end portions 88 and 90 thereof for the particular environment in which the assembly is adapted to be mounted. An annular or washer-shaped metallic flux collector element 66 is interposed between the U-frame bight portion 56 and the adjacent bobbin end flange 18 and is in effect recessed or countersunk into the casing end flange 48, as shown in FIG. 4. In practice, the flux collector element 66 is confined between and held in pressed engagement with the bobbin 12 and the U-frame 54 so that good metal-to-metal contact is assured between it and the U-frame whereby they collectively provide a substantial metallic mass that facilitates and enhances transfer of magnetic flux between the armature 22 and the flux collector.

Further, with regard to the structural feature last described, it will be observed that the armature 22 extends from the bobbin 12 through aligned openings 68 and 70 of identical size in the U-frame 54 and flux collector element 66, and its movement to the left is limited so as to prevent it from falling out of the bobbin by a cross bar 72 which is carried by a plurality (here shown as two) of laterally spaced pins 74 and 76 that extend longitudinally from the spool 12 equidistantly from the axis of the bore 17 and at diametrically opposite sides of the bore. In practice, particularly when the bobbin is injection molded, the pins 74 and 76 are formed integrally with the bobbin and the cross bar 72; and the pins are sufficiently long to hold the cross bar normally spaced sufficiently away from the adjacent end of the armature so as not to interfere with free movement of the latter in use. Thus, in operation, when the solenoid is energized, the U-frame 54 and the mounting bracket 80 collectively provide an annular flow path for magnetic flux generated by the energized coil winding 14. The magnetic flux must of course travel from the armature 22 to and through the bight portion of the U-frame 54. Manifestly, since the armature 22 must necessarily have essentially unrestricted reciprocable movement in use, clearance must be provided between the armature and the U-frame 54. However, this clearance interrupts the flow of magnetic flux between the armature and the U-frame and the amount of interference to flow of the magnetic flux is inversely proportional to the square of the width of the intervening air gap defined by the clearance. Thus, in the interest of simultaneous miniaturization of the solenoid parts and maximization of efficiency in operation, it is desirable that the width of the air gap be kept as small as possible and that the width of the air gap be kept uniform entirely around the armature. These relationships are assured and maintained according to the present invention by the manner in which the interrelated parts of the bobbin 12, the armature 22 and the flux collector U-frame 54 involved are associated and correlated each with respect to the others.

More particularly, the valve end of the solenoid bobbin 12 is held securely with respect to the valve 24 and the mounting bracket 80 at final assembly by a plurality (here shown as two) of pins 92 and 94 which are formed integrally with the valve body 26 and extend through openings 100 and 102 in the mounting bracket 80 into diametrically opposed openings 96 and 98 in the bobbin flange 20. The pins 92 and 94 preferably are press-fitted into the aligned openings 96-102 so that they hold the related parts securely against relative lateral or rotative movement each with respect to the others. The opposite end of the bobbin 12 remote from the valve 24 also is held securely against lateral movement and with the bore 17 precisely centered with respect to the openings 68 and 70 in the adjacent flux collector members 56 and 66 by the pins 74 and 76 that extend through and snugly fit inwardly opening aligned recesses 104 and 106 in the U-frame bight portion 56 and in the flux collector element 66 at diametrically opposite sides of the openings 68 and 70. In practice, the pins 74 and 76 preferably are press-fitted into the recesses 104 and 106 so as to hold the left hand end of the bobbin 12 securely and to assure precise concentricity between the bobbin bore 17 and the flux collector openings 68 and 70.

Precise concentricity between the armature 22 and the flux collector openings 68 and 70 is obtained according to the present invention by a plurality of circumferentially spaced ribs or ridges 108 provided on the bobbin 12 in the bore 17 immediately adjacent to the bobbin end flange 18. These ribs or ridges 108 provide essentially narrow lands that slidably engage and support the projecting left hand terminal portion of the armature 22. In practice, three ribs or lands 108 is the preferred number. Simultaneous engagement between the lands 108 and the armature 22 assures precise coaxial positioning of the armature and the bore 17 irrespective of slight out-of-roundness of the bore that may occur when the bobbin 12 is injection molded of plastic resin material; and this is true even though the degree of out-of-roundness or the particular cross sectional shape of the bore varies from one bobbin to another. Thus, since the supporting lands 108 assure precise concentricity between the bobbin 22 and the bore 17 and since the locating pins 74 and 76 assure precise concentricity between the flux collector openings 68 and 70 and the bore 17, precise concentricity in a practical sense also is assured between the armature 22 and the flux collector openings 68 and 70 and this is true even though the opposite or valve end of the armature is permitted to float laterally within limits defined by the circumferential clearance between the armature and the bore. For this reason, the width of the air gap between the armature 22 and the flux collector at the openings 68 and 70 is adequate to assure the necessary clearance required to prevent interference with the reciprocatory travel of the armature and at the same time it can be kept sufficiently narrow to assure minimum or relatively insignificant interference to flow of magnetic flux between the armature and the flux collector. As a consequence, adequate mechanical force is produced reliably by the armature 22 when the coil 10 is energized using a minimum amount of wire in the coil winding 14. At the same time, the lands 108 support the adjacent terminal portion of the armature 22 in its precisely concentric location without undue or significant drag on or interference with reciprocal movement of the armature that otherwise would either reduce the mechanical force developed by the armature or alternatively require a greater amount of wire in the winding 14 or an undesirable increase in the size of the solenoid portion of the assembly.

While it will be apparent that the invention herein described is well calculated to achieve the benefits and advantages as hereinabove set forth, it will be appreciated that the invention is susceptible to modification, variation and change without departing from the spirit thereof.

We claim:

1. In a solenoid of the type having an electrical coil including a bobbin formed with a central bore, and a longitudinally movable armature mounted in said bore with circumferential sliding clearance therebetween, the improvement comprising flux collector means defining a flow path for magnetic flux around said coil, said flux collector means having laterally spaced longitudinal members at opposite sides of said coil and transverse members at opposite ends of said coil, at least one of said transverse members overlying said central bore at one end of said bobbin, said one transverse member being formed with an opening having the same cross-sectional configuration as said armature through which the latter is projectable by energization of said coil, said opening being slightly larger than said armature to provide annular clearance around the latter in the projected position and to define an air gap between said one transverse member and said armature which is essentially narrow to minimize resistance to flow of magnetic flux between the armature and said one transverse member;

first positioning means interconnecting said bobbin and said transverse members holding said central bore and said opening disposed essentially concentrically with respect to each other; and second positioning means interacting between said bobbin and said armature supporting the latter at circumferentially spaced points to compensate for out-of-roundness of said bore and for maintaining said air gap of relatively uniform width throughout its circumference.

2. A solenoid as defined by claim 1 including means carried by said first positioning means cooperative with said armature for limiting longitudinal sliding movement of the latter in one direction.

3. In a solenoid of the type having an electrical coil including a bobbin formed with a central bore, and a longitudinally movable armature mounted in said bore with circumferential sliding clearance therebetween, the improvement comprising flux collector means defining a flow path for magnetic flux around said coil, said flux collector means having spaced longitudinal and transverse members at opposite sides and ends, respectively, of said coil, at least one of said transverse members overlying said central bore at one end of said bobbin, said one transverse member having an opening opposite said bore at one end of the latter through which said armature is projectable by energization of said coil, said opening being diametrically larger than said armature to provide annular clearance and an air gap around the latter in the projected position;

first means interconnecting said bobbin and said flux collector means holding the central bore of said bobbin essentially concentrically with respect to said opening; and second means interacting between said bobbin and said armature at the end of said bore adjacent to said one transverse member supporting the armature at circumferentially spaced points to compensate for out-of-roundness of said bore and for maintaining said air gap of relatively uniform width throughout its circumference.

4. A solenoid as defined by claim 3 wherein said bobbin is provided at the mentioned end thereof with a radially extending member, and wherein said first means comprises longitudinal pins disposed radially outwardly of said bore and carried by and connected to at least one of said radially extending and transverse members, and including stop means carried by at least one of said pins, said stop means being disposed in the path of travel of said armature and spaced longitudinally from said one transverse member at the side thereof remote from said bobbin.

5. A solenoid as defined by claim 3 wherein said bobbin is provided with a radial flange at the end thereof adjacent to the mentioned transverse member of said flux collector means, and wherein said first means comprises diametrically opposed, longitudinal pins fixed to said bobbin flange, said pins extending through and snugly fitting openings provided in said one transverse member.

6. A solenoid as defined by claim 5 wherein said pins project beyond said one transverse member, and including a stop bar interconnecting the projecting ends of said pins and disposed in the path of travel of said armature for limiting longitudinal movement of the latter in one direction.

7. A solenoid as defined by claim 6 including a flux collector element interposed between said one transverse member and said bobbin, said flux collector element having a central opening of substantially the same diameter as and disposed in alignment with the opening in said one transverse element, and other openings accepting and snugly fitting said pins for holding the opening in said flux collector element precisely concentrically with respect to the central bore of said bobbin and maintaining relatively large surface-to-surface contact between said element and said one transverse member.

8. A solenoid as defined by claim 3 wherein said flux collector means includes a flux collector element interposed between one of said transverse members and one end of said bobbin; and means forming a mounting bracket for said solenoid at the opposite end of said bobbin, said flux collector element and said mounting bracket means seating against opposite ends of said bobbin and holding the latter against longitudinal movement along the axis of said central bore, and wherein said first means comprises first pin means interconnecting said one transverse member and one end of said bobbin, and second pin means interconnecting said mounting bracket means and the other end of said bobbin.

9. A solenoid as defined by claim 8 wherein said one transverse member and said flux collector element are provided with openings accepting and snugly fitting said first pin means and coactive with said bobbin to hold the central bore thereof precisely centered with respect to the opening in said one transverse member through which said armature is projected in use.

10. In a solenoid of the type having an electrical coil including a bobbin formed with a central bore, and a longitudinally movable armature mounted in said bore with circumferential sliding clearance therebetween, the improvement comprising flux collector means defining a flow path for magnetic flux around said coil having a member overlying said central bore at one end of said bobbin, said member having an opening opposite said bore at one end of the latter through which said armature is projectable by energization of said coil, said opening being diametrically larger than said armature to provide annular clearance and an air gap around the latter in the projected position; and means for holding the central bore of said bobbin and said armature essentially concentric with respect to said opening, said means including a plurality of circumferentially spaced elements in close proximity to said opening for slidably supporting said armature and compensating for variations in roundness of said bore due to procedures in the manufacture of said bobbin or otherwise, whereby to maintain said air gap relatively uniform in width throughout its circumference.

11. A solenoid as defined by claim 10 including means coactive with said armature for limiting longitudinal sliding movement thereof in at least one direction.

12. A solenoid as defined by claim 10 wherein said flux collector means includes means forming a mounting bracket for said solenoid at the end thereof remote from said flux collector member.

13. A solenoid as defined by claim 10 wherein said flux collector means comprises a U-shaped member disposed with the middle portion thereof at one end of said bobbin and the arm portions thereof at opposite sides of the bobbin, and means forming a mounting bracket for said solenoid extending between and in physical contact with said arm portions at the opposite end of said bobbin.

14. A solenoid as defined by claim 13 including
a flux collector element interposed between the middle portion of said U-shaped member and the adjacent end of said bobbin,
said flux collector element and said mounting bracket means seating against the opposite ends of said bobbin and holding the latter against longitudinal movement in and relative to said flux collector means.

15. A solenoid as defined in claim 12 including casing means enclosing said coil and having an end portion overlapping the end of said bobbin remote from said mounting bracket and confining said bobbin between said overlapping portion and said mounting bracket.

16. A solenoid as defined by claim 15 including
guide means cooperative with said bobbin and said casing for rotatively or angularly positioning said bobbin in said casing.

17. A solenoid as defined by claim 16 wherein said guide means includes
a guide lug on said bobbin, and
a guide way on said casing accepting said guide lug and coactive therewith to hold said bobbin rotatively fixed in said casing while permitting said bobbin to move axially in said casing.

18. A solenoid as defined by claim 17 wherein said guide way opens through one end of said casing.

19. A solenoid as defined by claim 17 wherein said guide way opens through one end of said casing and terminates at the other end thereof in a closure in which said guide lug normally is disposed and that holds and protects said guide lug in use.

20. A solenoid as defined by claim 15 further including
locating means cooperative with said casing and with said mounting bracket to position said casing rotatively or angularly with respect to said flux collector means.

21. A solenoid as defined by claim 13 including a casing having an annular side wall portion surrounding said coil and disposed under said arm portions,
said casing also having an end portion overlapping the end of said bobbin remote from said mounting bracket and confining and retaining said bobbin against endwise movement between said overlapping portion and said mounting bracket.

22. A solenoid as defined by claim 14 wherein said flux collector element has a central opening therein and including
casing means enclosing said coil and having an end portion peripherally overlapping the end of said bobbin remote from said mounting bracket and provided with a central opening accepting said flux collector element,
whereby the overlapping end portion of said casing surrounds said flux collector element and whereby the latter is confined between and is seated solidly against the middle portion of said U-shaped member and said adjacent end of said bobbin.

23. A solenoid as defined by claim 10 including fixed pins coactive with said bobbin at opposite ends thereof and operative to retain the same with said central bore in coaxial relation with respect to the opening in the mentioned member of said flux collector means.

24. A solenoid as defined by claim 23 including stop means carried by certain of said pins and extending transversely across the central bore of said bobbin and in the path of travel of said armature to limit longitudinal travel of the latter through the opening in the mentioned member of said flux collector means.

25. A solenoid as defined by claim 15 wherein said casing means and said bobbin are injection molded of plastic resin material and said flux collector means and said armature are of electrically conductive metallic material.

26. A solenoid as defined by claim 10 including valve means at the end of said bobbin remote from the mentioned member of said flux collector means, and
wherein said last mentioned means includes attaching means on said valve means interconnecting the latter and said bobbin through said flux collector means.

27. A solenoid as defined by claim 26 wherein said flux collector means includes a metal U-frame having arm portions disposed in embracing relation with respect to said bobbin and attached at the ends thereof to said valve means; and wherein said flux collector means further includes
a mounting bracket for said solenoid interposed between said bobbin and said valve means extending transversely of and interconnected with said arm portions.

28. A solenoid as defined by claim 15 wherein said flux collector means further includes a U-shaped member having arm portions disposed in embracing relation with respect to said casing and said bobbin; and
wherein said mounting bracket is interposed between said casing means and said valve means and extends transversely between and is interconnected with said arm portions.

29. A solenoid as defined by claim 10 wherein said flux collector means includes longitudinal arm members at opposite sides of said coil; and
means forming a mounting bracket for said solenoid at the end thereof remote from said flux collector member, said solenoid further including
casing means enclosing said coil and having an end portion overlapping the end of said bobbin remote from said mounting bracket,
said longitudinal arm members being attached to said valve means,
said mounting bracket being interposed between said casing and said valve means and extending transversely between and interconnected with said arm portions, and
said solenoid further including attaching means on said valve means interconnecting the latter and said bobbin through said mounting bracket.

30. A solenoid as defined by claim 29 wherein said attaching means comprises spaced pins on and formed integrally with said valve means extending into said bobbin through said mounting bracket.

* * * * *